United States Patent
Kobayashi et al.

[11] Patent Number: 6,068,407
[45] Date of Patent: *May 30, 2000

[54] SEAL FOR AN ANTI-FRICTION BEARING

[75] Inventors: Eiichi Kobayashi; Yutaka Daikuhara, both of Nagano-ken, Japan

[73] Assignee: Minebea Kabushiki-Kaisha, Nagano-ken, Japan

[*] Notice: This patent is subject to a terminal disclaimer.

[21] Appl. No.: 09/330,006

[22] Filed: Jun. 11, 1999

Related U.S. Application Data

[62] Division of application No. 08/752,412, Nov. 19, 1996, Pat. No. 5,957,591.

[30] Foreign Application Priority Data

Nov. 20, 1995 [JP] Japan ..................... 7-325157

[51] Int. Cl.⁷ ............... F16C 33/76; F02F 5/00; F02F 11/00
[52] U.S. Cl. ............ 384/488; 384/477; 384/481; 277/596; 277/442
[58] Field of Search ..................... 384/465, 477, 384/478, 480, 481, 482, 488, 489, 607, 903, 907, 129; 277/345, 346, 347, 348, 349, 350, 351, 352, 353, 404, 407, 409, 411, 596, 442

[56] References Cited

U.S. PATENT DOCUMENTS

| | | | |
|---|---|---|---|
| 3,396,977 | 8/1968 | Iguchi | 384/477 |
| 4,443,348 | 4/1984 | Wright et al. | 252/37.2 |
| 4,557,612 | 12/1985 | Neal | 384/477 |
| 4,650,195 | 3/1987 | Dreschmann et al. | 277/50 |
| 4,655,617 | 4/1987 | Yasui et al. | 384/465 |
| 4,772,138 | 9/1988 | Dreschmann et al. | 384/488 |
| 4,846,592 | 7/1989 | Tsumori et al. | 384/477 |
| 4,854,749 | 8/1989 | Kohigashi et al. | 384/482 |
| 5,037,213 | 8/1991 | Uchida et al. | 384/482 |
| 5,133,609 | 7/1992 | Ishiguro | 384/486 |
| 5,426,988 | 6/1995 | Ohata et al. | 384/488 |
| 5,513,918 | 5/1996 | Wan | 384/477 |
| 5,605,741 | 2/1997 | Hite et al. | 277/235 A |
| 5,615,896 | 4/1997 | Morvant | 277/235 A |
| 5,615,897 | 4/1997 | Akita | 277/235 A |

FOREIGN PATENT DOCUMENTS 0037477  2/1991  Japan ................. 277/235 A

*Primary Examiner*—David A. Bucci
*Assistant Examiner*—Matthew A. Kaness
*Attorney, Agent, or Firm*—Lowe Hauptman Gopstein Gilman & Berner, LLP

[57] ABSTRACT

The invention permits stacking of seals without possibility of the sticking of their synthetic rubber seal members to one another. Moreover, when assembling the seals to produce anti-friction bearings, the invention permits storing the seals as a stack in a stocker of an automatic assembler and, unlike the case of using silicon or like prior art anti-sticking material, substantially eliminates generation of fine particles or the like adversely affecting precision apparatuses and deteriorating the reliability thereof. In an anti-friction bearing comprising an inner ring (1), an outer ring (2), and rolling elements (3) provided between the inner and outer rings, a side gap between the inner and outer rings is closed by seals (4) of the invention, which each include a synthetic rubber seal member (6) and a surface active material (7) coated thereon.

2 Claims, 2 Drawing Sheets

SEAL FOR AN ANTI-FRICTION BEARING

This application is a Division of Application Ser. No. 08/752,412 filed Nov. 19, 1996 now U.S. Pat. No. 5,957,591.

BACKGROUND OF THE INVENTION

1. Field of the Invention

This invention relates to an anti-friction bearing, in which seal members are provided between inner and outer rings. The invention more particularly relates to a seal member for such an anti-friction bearing.

2. Description of the Prior Art

In an anti-friction bearing which comprises an inner ring, an outer ring and balls or like rolling elements provided between the inner and outer rings, seal members are provided between the inner and outer rings.

The seal members each comprise a metal core and a synthetic rubber member molded as a seal member on the metal core surface. When assembling such seals to produce anti-frictional bearings, they are stocked in a stacked form in a stocker of an automatic assembler.

The seals have to be supplied smoothly from the stocker to the automatic assembler. To prevent mutual sticking of the seals, the surface of the seal member molding of synthetic rubber is coated with an anti-sticking agent, for instance an oil mainly composed of silicon.

When the prior art anti-friction bearing is used for journaling in a rotary part of a precision machine, fine particles of the anti-sticking material are scattered in a gaseous form from the seal member surface to adversely affect other mechanisms in the precision machine.

For example, where the bearing is used for a rotary part of a hard disc drive motor, fine anti-sticking agent particles (of 1 µm and above) may be attached to the surface of a magnetic disc, which is rotating at a high speed with slight interstices (of 1 µm and below) provided between it and a magnetic head. The attached particles may collide with and cause damage to the magnetic head.

SUMMARY OF THE INVENTION

An object of the invention is to provide an anti-friction bearing, which can eliminate damage to the magnetic head.

To attain this object, in an anti-friction bearing according to the invention which comprises an inner ring, an outer ring, and rolling elements provided between the inner and outer rings, the side gap between the inner and outer rings is closed by seals each including a synthetic rubber member and a surface active material coated thereon.

Suitably, the seals in the anti-friction bearing according to the invention, each include a synthetic rubber molding formed on a metal core.

BRIEF DESCRIPTION OF THE DRAWINGS

The above and other objects, features and advantages of the invention will become more apparent from the detailed description of the preferred embodiment when the same is read with reference to the accompanying drawings, in which.

DETAILED DESCRIPTION OF THE PREFERRED EMBODIMENT

An embodiment of the anti-friction bearing according to the invention will now be described in detail with reference to the drawings 1 to 3.

Figure 1:
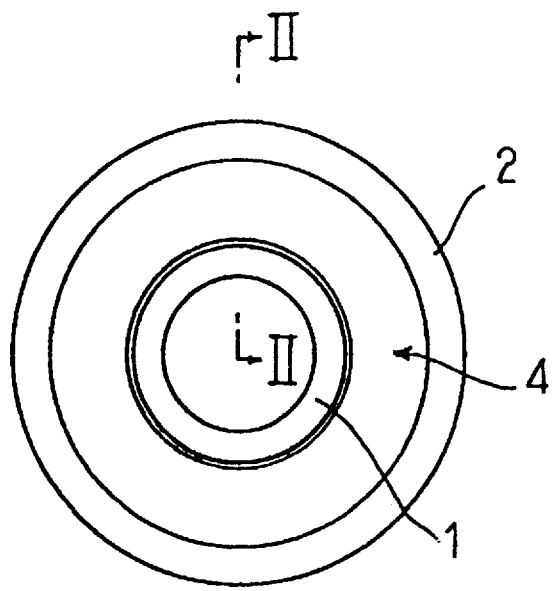
FIG. 1 is a front view showing an embodiment of the anti-friction bearing according to the invention.
Figure 2:
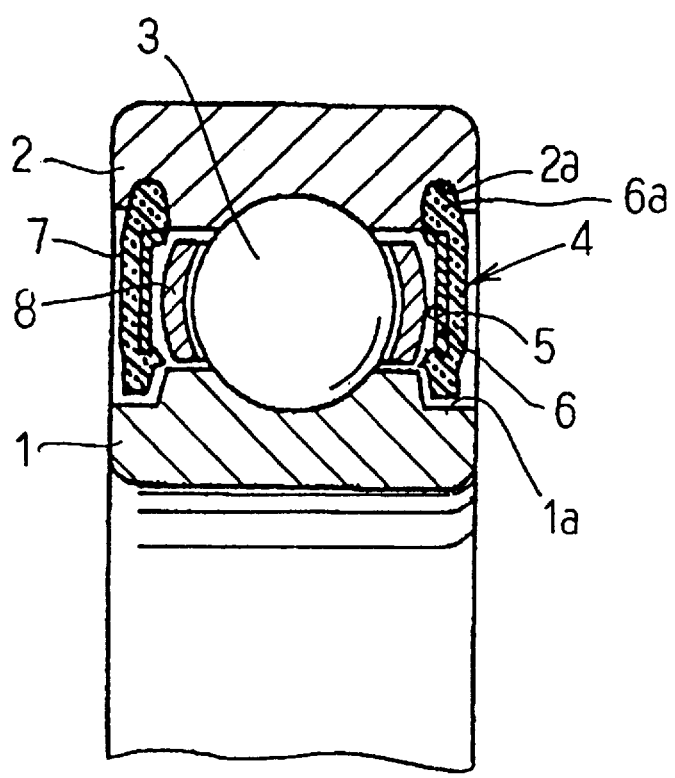
FIG. 2 is a sectional view taken along line II—II in FIG. 1.

FIGS. 1 and 2 show the anti-friction bearing according to the invention. In the figures, reference numeral 1 designates an inner ring, 2 an outer ring, and 3 balls provided as rolling elements between the inner and outer rings.

Figure 3:
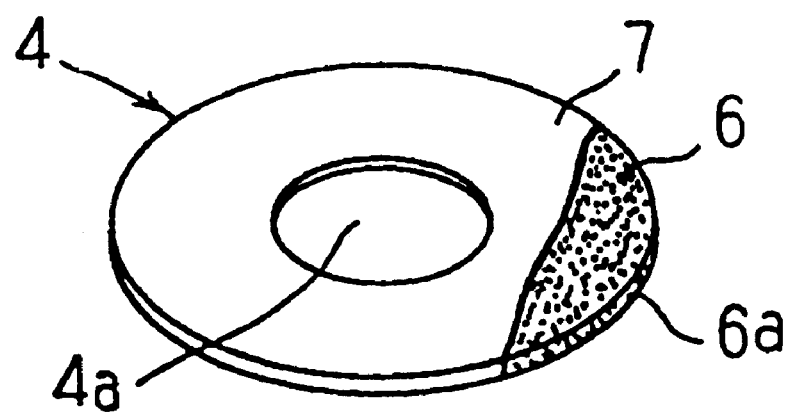
FIG. 3 is a perspective view showing a seal used for the anti-friction bearing according to the invention.

Reference numeral 4 designates seals which each essentially close the side gap between the inner and outer rings. Each seal 4 includes a ring-like metal core 5 and a synthetic rubber seal member 6 molded thereon. As shown in FIG. 3, a very thin surface active material layer 7 is formed as a surface active coating on the surface of the seals 4.

Reference numeral 8 designates ball retainers.

By using as the surface active material a substance which is mainly composed of fatty acid soap, the seal member surface can be made slippery to provide a superior effect of preventing the sticking of the seals to one another and also facilitate the assembling of the seals to produce the bearing.

The surface active material layer 7 as the surface coating of the seal, may be formed agitating an aqueous solution of the surface active material with the non-coated seal dipped therein for a predetermined period of time. Alternatively, the aqueous solution of the surface active material is sprayed on the non-coated seal, followed by a drying treatment.

Each seal 4 is assembled by fitting the outer periphery 6a of the seal member 6 in a mounting groove 2a formed in the outer ring 2 by adequately deforming the outer periphery 6a against the elastic restoring force thereof.

By so doing, the edge of the central opening 4a of the seal is faced on the outer periphery of a reduced diameter edge portion 1a of the inner ring 1. In this way, the side gap between the inner and outer rings is closed by the seals 4.

Fine particles and gases, which are generated from the surface of the seals 4 in the anti-friction bearing having the above structure and undesired for precision apparatuses, were measured to confirm that their level is far below a prescribed level.

While in the above embodiment the surface active material was coated after the molding of the seal member, a surface active material which is mainly composed of fatty acid soap may also serve as a releasing agent when molding the seal member. In other words, this surface active material can facilitate the releasing in the molding process when it is coated beforehand.

The anti-friction bearing according to the invention having the above construction, provides the following functions and effects.

Since a surface active material which does not adversely affect precision apparatuses is coated, instead of the prior art anti-sticking material mainly composed of silicon, on the surface of the anti-friction bearing seal members, fine particles or the like adversely affecting precision apparatuses and deteriorating the reliability thereof are hardly generated from the seals in the anti-friction bearing according to the invention.

In addition, since the seals of the anti-friction bearing according to the invention have the surface active material layer as their surface coating, they can be stacked without possibility of the sticking of the synthetic rubber seal members to one another. Thus, when assembling them to produce anti-friction bearings, they can be stored as a stack in a stocker of an automatic assembler and automatically assembled smoothly between the inner and outer rings.

What is claimed is:

1. A seal (4) for an anti-friction bearing used for a rotary part of a hard disc drive motor, the seal, comprising:

a seal member made of synthetic rubber (6);

said seal member molded on an outboard side of a metal core (5);

said metal core (5) having a ring-like shape;

all surfaces of said seal (4) having a coating of a surface active material which is mainly composed of a fatty acid soap;

the seal adapted for closing a side gap between inner and outer rings of an anti-friction bearing used for a rotary part of a hard disc drive motor.

2. A seal (4) for an anti-friction bearing, used for a rotary part of a hard disc drive motor, the seal comprising:

a metal core (5) having a ring-like shape;

a seal member made of synthetic rubber (6);

said seal member molded on an outboard side of said metal core (5);

an inner ring (1) and an outer ring (2) of said anti-friction bearing having a side gap therebetween;

the seal essentially closing the side gap between said inner ring (1) and said outer ring (2) of said anti-friction bearing;

all surfaces of said seal (4) having a coating of a non-sticky surface active material selected for reducing adherence of stacked seals to each other.

* * * * *